Patented Apr. 10, 1945

2,373,335

UNITED STATES PATENT OFFICE 2,373,335

ANTIOXIDANTS

Philip T. Paul, Naugatuck, Conn., assignor to United States Rubber Company, New York, N. Y., a corporation of New Jersey No Drawing. Application November 10, 1943,
Serial No. 509,771

12 Claims. (Cl. 260—800)

This invention relates to a new class of antioxidants or age-resisters for organic substances which tend to deteriorate by absorption of oxygen from the air, e. g., rubber or allied gums, unsaturated, fatty oils, such as unsaturated vegetable oils, essential oils, petroleum oils and their derivatives, such as gasolines, soaps, aldehydes, synthetic resins, turpentine, insecticides, such as derris root, cube root and pyrethrum, and the like.

According to the invention, the organic substances are incorporated with a chemical of the formula

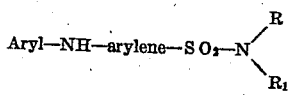

where aryl and arylene represent an aromatic radical of the benzene or naphthalene series; and R and R₁ represent separate open-chain alkyl radicals or joined alkylene radicals. The aryl groups may be further substituted by groups such as alkyl, alkoxy, alkenyloxy, halogen, tertiary amino, etc.

Exemplary of such compounds are the following:

p-Anilino benzene sulfonyl dimethyl amide
p-Anilino benzene sulfonyl diethyl amide
p-Anilino benzene sulfonyl piperidide
p-(p-Toluidino) benzene sulfonyl diamyl amide
o-(p-Anisidino) benzene sulfonyl dimethyl amide
m-(p-Chlorophenyl) benzene sulfonyl dibutyl amide
4-anilino naphthalene sulfonyl (1-) dimethyl amide
p-(p-Dimethyl amino phenyl) benzene sulfonyl dimethyl amide.

These chemicals may be prepared by reacting a halogen substituted sulfonylamide with an acyl derivative of a primary arylamine and subsequently removing the acyl group by hydrolysis. This is illustrated in the preparation of para-anilino benzene sulfonyl piperidide, as follows:

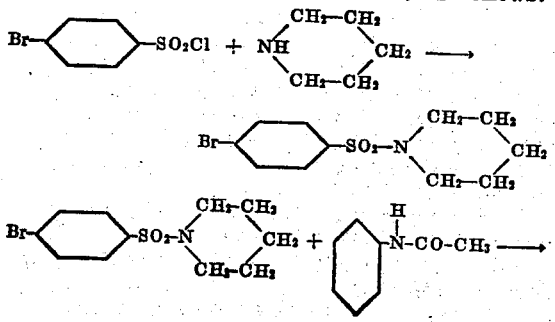

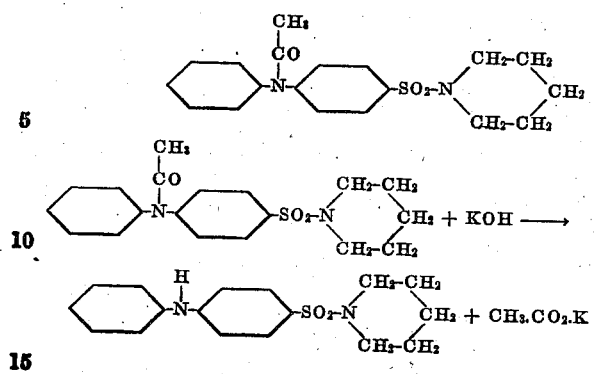

PREPARATION P-BROMO BENZENE SULFONYL PIPERIDIDE

To a solution of 25 g. p-bromo benzene sulfonyl chloride in 60 cc. benzene, 20.8 g. piperidine was added slowly with cooling. A vigorous reaction ensued and it was necessary to add more benzene to keep the reaction mixture fluid. After the exothermic reaction had subsided the benzene solution was washed with water, then with dilute hydrochloric acid, then with dilute sodium hydroxide and finally with water to neutrality. The benzene was evaporated and the residue crystallized from alcohol. p-Bromo benzene sulfonyl piperidide was obtained in an 85% yield; melting point 91–91.5° C.

PREPARATION P-ACETANILIDO BENZENE SULFONYL PIPERIDIDE

A mixture of 20 g. p-bromo benzene sulfonyl piperidide, 10.67 g. acetanilide, 10.9 g. anhydrous potassium carbonate, 0.1 g. copper and 50 cc. methyl n-hexyl carbinol as solvent were refluxed with stirring 126½ hours. The mixture was cooled and the liquid separated by decantation. Dioxane was added and the solid material again washed by decantation. The various decanted solutions were combined and subjected to a steam distillation to remove the organic solvents.

The material insoluble in the dioxane was leached with water, filtered and the solid filter boiled with benzene and filtered. This benzene filtrate was steam distilled and the residue from the steam distillation combined with the residue from the other steam distillation.

The p-acetanilido benzene sulfonyl piperidide was not isolated in a pure form but was hydrolyzed directly to p-anilino benzene sulfonyl piperidide.

Preparation p-Anilino Benzene Sulfonyl Piperidide

The combined steam distillation residues were freed from water and refluxed with 90 g. potassium hydroxide in 90 cc. water and 375 cc. alcohol. After a 2 hour reflux the solution was diluted with water to 1000 cc. and filtered. The solid cake was recrystallized from alcohol using decolorizing charcoal. On cooling p-anilino benzene sulfonyl piperidide separated as light brown crystals melting range 168–171° C. Yield 18.9 g.

The following example, in which the parts are by weight, is given to illustrate the effectiveness of the chemicals as antioxidants in rubber.

EXAMPLE

*Master batch*

| | |
|---|---|
| Pale crepe | 100 |
| Zinc oxide | 10 |
| Whiting | 60 |
| Lithopone | 60 |
| Zinc soap of cocoanut oil acids | 0.5 |
| Sulfur | 3.0 |
| Tetramethyl thiuram monosulfide | 0.15 |
| | 233.65 |

To a portion of the above master batch, p-anilino benzene sulfonyl piperidide was added in the ratio of 1.0 part to 100 parts rubber. The stocks were cured 25 minutes at 30 pounds per square inch steam.

| Per cent elongation | Control stock unaged tensiles | Antioxidant stock, lbs./sq. in. |
|---|---|---|
| 300 | 400 | 390 |
| 500 | 880 | 990 |
| Break | 2,200–723 | 2,190–705 |

Aged 48 hours under 300 lbs./sq. in. of oxygen.

| | | |
|---|---|---|
| 300 | 210 | 400 |
| 500 | | 810 |
| Break | 350-333 | 1,160-696 |

The invention may be applied to the preservation of, broadly, natural rubber compositions as well as artificially-prepared rubber compositions, such as polychloroprene, olefin, polysulfides, butadiene polymers, modified butadiene polymers (Buna N and Buna S), and including reclaims, and latices of such compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

Having thus described my invention, what I claim and desire to protect by Letters Patent is:

1. A method of retarding the deterioration of an organic substance which tends to deteriorate by absorption of oxygen from the air which comprises incorporating therein an aryl aminoaryl sulfonylamide of the general formula

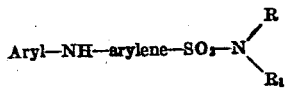

where aryl and arylene represent an aromatic radical selected from the class consisting of the benzene, and naphthalene series; and R and R₁ represent radicals selected from the group consisting of separate open-chain alkyl radicals, and joined alkylene radicals.

2. A method of retarding the deterioration of a rubber composition which tends to deteriorate by absorption of oxygen from the air which comprises incorporating therein an aryl aminoaryl sulfonylamide of the general formula

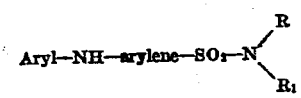

where aryl and arylene represent an aromatic radical selected from the class consisting of the benzene, and naphthalene series; and R and R₁ represent radicals selected from the group consisting of separate open-chain alkyl radicals, and joined alkylene radicals.

3. An organic substance which tends to deteriorate by absorption of oxygen from the air containing an aryl aminoaryl sulfonylamide of the general formula

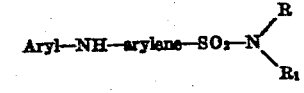

where aryl and arylene represent an aromatic radical selected from the class consisting of the benzene, and naphthalene series; and R and R₁ represent radicals selected from the group consisting of separate open-chain alkyl radicals, and joined alkylene radicals.

4. A rubber composition containing an aryl aminoaryl sulfonylamide of the general formula

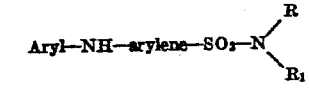

where aryl and arylene represent an aromatic radical selected from the class consisting of the benzene, and naphthalene series; and R and R₁ represent radicals selected from the group consisting of separate open-chain alkyl radicals, and joined alkylene radicals.

5. A method of retarding the deterioration of an organic substance which tends to deteriorate by absorption of oxygen from the air which comprises incorporating therein a phenyl aminoaryl sulfonyl dialkylamide.

6. A method of retarding the deterioration of an organic substance which tends to deteriorate by absorption of oxygen from the air which comprises incorporating therein a phenyl aminoaryl sulfonyl piperidide.

7. A method of preserving a rubber composition which comprises incorporating therein a phenyl aminoaryl sulfonyl dialkylamide.

8. An organic substance which tends to deteriorate by absorption of oxygen from the air containing a phenyl aminoaryl sulfonyl dialkylamide.

9. A rubber composition containing a phenyl aminoaryl sulfonyl dialkylamide.

10. A method of preserving a rubber composition which comprises incorporating therein a phenyl aminoaryl sulfonyl piperidide.

11. An organic substance which tends to deteriorate by absorption of oxygen from the air containing a phenyl aminoaryl sulfonyl piperidide.

12. A rubber composition containing a phenyl aminoaryl sulfonyl piperidide.

PHILIP T. PAUL.